United States Patent

Hammon

[15] 3,665,956

[45] May 30, 1972

[54] GAS PRESSURE REGULATOR

[72] Inventor: George L. Hammon, Oakland, Calif.

[73] Assignee: Chemetron Corporation, Chicago, Ill.

[22] Filed: Jan. 29, 1970

[21] Appl. No.: 6,786

[52] U.S. Cl. ............... 137/505.11, 137/116.5, 137/505.42, 137/529
[51] Int. Cl. ..................................................... F16k 31/365
[58] Field of Search .............. 137/116.7, 116.5, 505.11, 529, 137/505.42

[56] References Cited

UNITED STATES PATENTS

| 3,336,942 | 8/1967 | Keith | 137/529 |
| 714,143 | 11/1902 | Carlson | 137/505.11 X |
| 975,838 | 11/1910 | Derby | 137/505.11 |
| 2,342,659 | 2/1944 | Grove | 137/116.5 |
| 2,887,123 | 5/1954 | Becker | 137/505.11 |
| 3,250,288 | 5/1966 | Hammon | 137/116.3 |
| 3,489,172 | 1/1970 | Whitmore | 137/529 X |

Primary Examiner—Harold W. Weakley
Attorney—Nicholas M. Esser

[57] ABSTRACT

In a gas pressure regulator of the type having a normally closed diaphragm-actuated valve, means are provided for relieving residual gas pressure in the regulator. Said means is operative at any orientation of the regulator.

4 Claims, 2 Drawing Figures

Patented May 30, 1972  3,665,956
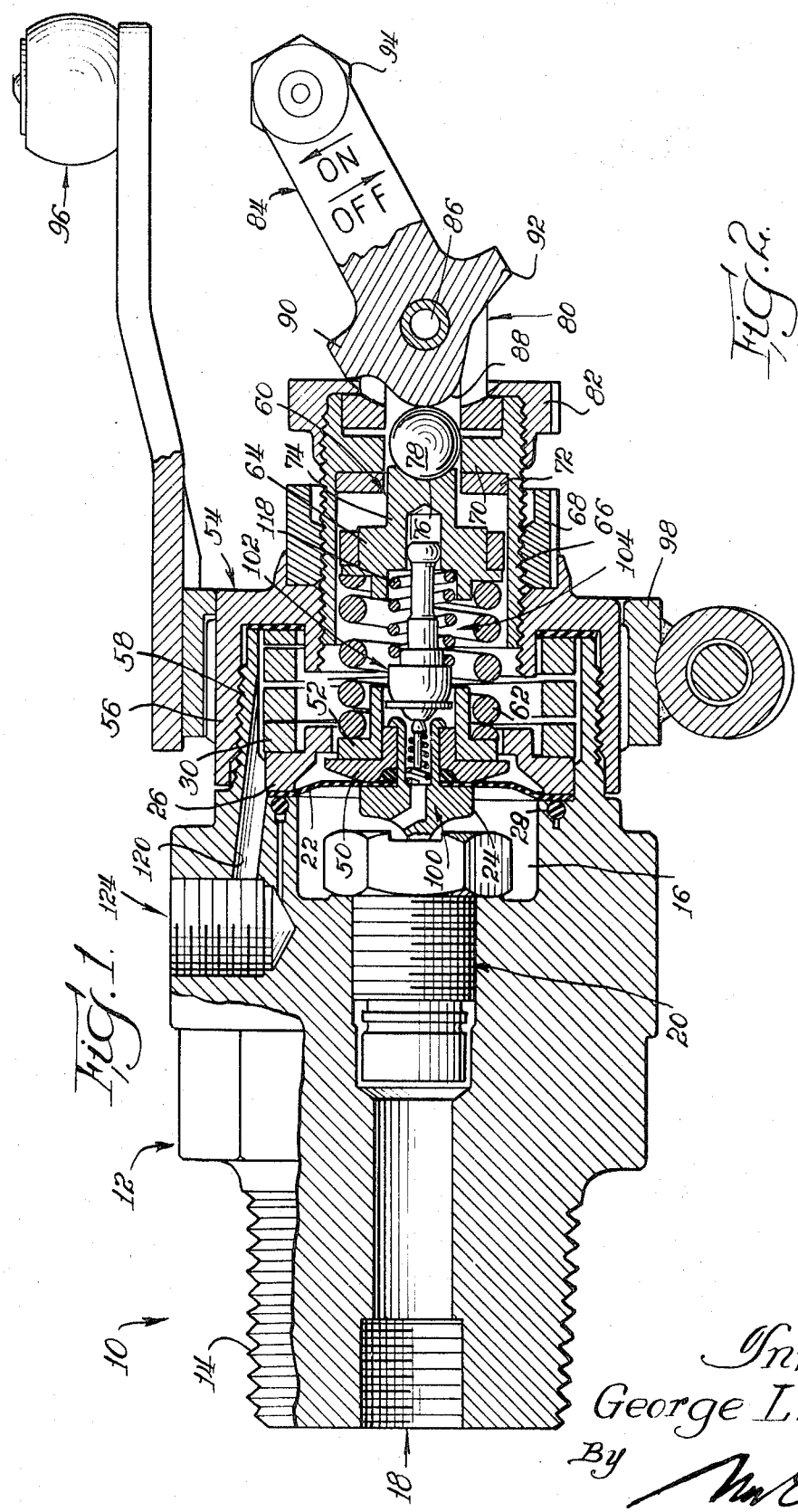
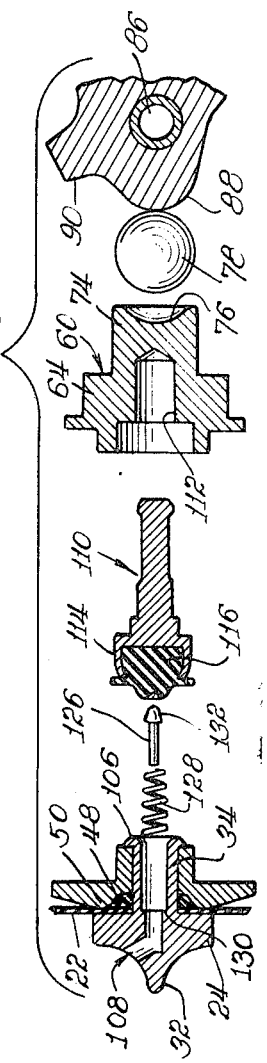
Inventor
George L. Hammon
By
Att'y

GAS PRESSURE REGULATOR

BACKGROUND OF THE INVENTION

This invention pertains generally to gas pressure regulators and more particularly to an improved gas pressure regulator having means for relieving residual gas pressure in the regulator.

In a gas pressure regulator of the type disclosed in U.S. Pat. No. 3,250,288, the outlet pressure of the gas is adjusted to permit the gas to flow through the regulator at a desired flow rate. In such a regulator, a normally closed valve is caused to be opened by flexure of a diaphragm to which a valve opening member is mounted. The diaphragm forms one wall of a chamber through which gas thus is permitted to flow (typically for breathing purposes at a flow rate of about 7 liters per minute) and at a regulated pressure of about 50 pounds per square inch. A control knob or lever or other control means may be actuated to permit the normally closed valve to be restored to shut off gas flow. In known regulators of this type, residual gas pressure remaining in the chamber after the normally closed valve has been restored to shut off gas flow acts on the diaphragm to lock the regulator in a shut-off condition. No provision is made for relieving such residual gas pressure. Thus, in order to open the normally closed valve, it is necessary to overcome the resistance of such residual gas pressure.

Accordingly, there is a need for an improved gas pressure regulator of the aforementioned type with provision for relieving residual gas pressure.

SUMMARY OF THE INVENTION

It is the principal object of this invention to provide an improved gas pressure regulator of the aforementioned type.

It is a more particular object of this invention to provide a gas pressure regulator having means for relieving residual gas pressure.

It is another object of this invention to provide such a gas pressure regulator in which the means for relieving residual gas pressure is operative at any orientation of the regulator.

The preceding objects may be attained in a gas pressure regulator of the type shown in U.S. Pat. No. 3,250,288. Such a regulator comprises a body having a chamber, valve means including a normally closed valve for controlling gas flow to the chamber, a diaphragm forming a wall of the chamber, a valve opening member mounted to the diaphragm and arranged to open such valve upon flexure of the diaphragm toward the valve and to permit such valve to be restored upon opposite flexure of the diaphragm, a member movable toward and away from the diaphragm, and resilient means disposed between the movable member and the diaphragm and adapted to cause flexure of the diaphragm toward such valve upon movement of the movable member toward the diaphragm and to permit opposite flexure of the diaphragm upon movement of the movable member away from the diaphragm.

In accordance with the principles of this invention, the gas pressure regulator further comprises means for relieving residual gas pressure. Preferably, such means is arranged to be operative at any orientation of the regulator.

These and other objects, features and advantages of this invention are evident from the following description, with the aid of the attached drawing, of a preferred embodiment of the invention.

BRIEF DESCRIPTION OF THE DRAWING

FIG. 1 is a longitudinal sectional view of a gas pressure regulator embodying the principles of this invention; and FIG. 2 is an exploded view of certain parts of the gas pressure regulator of FIG. 1.

DESCRIPTION OF THE PREFERRED EMBODIMENT

In the drawing, there is shown a gas pressure regulator 10 constituting a preferred embodiment of this invention. The regulator 10, which is similar in many respects to the regulator shown in U.S. Pat. No. 3,250,288, is designed to supply oxygen or other gas at controlled flow rates, as in emergency oxygen systems for aircraft and the like.

The regulator 10 is similar to the regulator shown in the aforementioned patent in that it generally comprises a body 12 having an integral threaded base 14 for connection to a source of oxygen or other gas under pressure and having an internal chamber 16 and an inlet 18 to and a plurality of outlets (not shown) from the chamber 16, a valve unit 20 including a normally closed valve (not shown) for controlling gas flow from the inlet 18 to the chamber 16, a diaphragm 22 forming a wall of the chamber 16, and a valve insert or valve opening member 24 mounted to the diaphragm 22 and adapted to open the normally closed valve of the valve unit 20 upon flexure of the diaphragm 22 toward the valve unit 20 and to permit such valve to be restored upon opposite flexure of the diaphragm 22. The valve unit 20 is similar to the valve unit described in the aforementioned patent to which reference may be had for further details.

As shown, the diaphragm 22 is positioned between a generally annular member 26 and a shoulder 28 of the body 12 and is held in place by means of a coiled spring 30 engaging the member 26. The valve opening member 24 has a generally conical tip portion 32 and a generally cylindrical stem portion 34. The latter portion 34 extends through an opening (not indicated) in the diaphragm 22. The opening is made gas-tight by means of a compressible sealing ring 48 surrounding the stem portion 34 of the member 24. The ring 48 is held in place by means of a flanged bushing 50. The stem portion 34 of the member 24 and the bushing 50 are integrally assembled in a manner to be described. Also, a spacer 52 is fitted onto the bushing 50. A cap 54 having an internally threaded skirt portion 56 is threaded onto an externally threaded generally tubular portion 58 of the body 12. The cap 54 and the generally tubular portion 58 of the body 12 generally enclose a space (not indicated) for the spring 30 and other parts of the regulator 10. The spring 30 is compressed between the member 26 and the cap 54 to hold the diaphragm 22 in place. Further details of these parts may be had by reference to the description of similar parts in the aforementioned patent.

The regulator 10 further generally comprises a member 60 movable toward and away from the diaphragm 22 and a compression spring 62 disposed between the diaphragm 22 and the member 60. The spring 62 is adapted, by reason of its length when uncompressed, to engage the spacer 52 and thus cause flexure of the diaphragm 22 toward the valve unit 20 upon movement of the member 60 toward the diaphragm 22 and to permit opposite flexure of the diaphragm 22 upon opposite movement of the member 60.

In the regulator 10, the movable member 60 comprises a suitably fabricated spring button 64 supported for axial movement within a sleeve 66. In the regulator shown in the aforementioned patent, to which reference may be had for further details, means generally corresponding to the means 60 comprises a threaded member movable along correspondingly threaded structure. The principles of this invention are considered to be equally applicable to a regulator having either arrangement of parts.

In operation of the regulator 10, as in operation of the regulator shown in the aforementioned patent, a condition of balance is achieved between the pressure of the oxygen or other gas within the chamber 16 and the compression of the spring 62. So long as the gas pressure on the diaphragm 22 is overcome by the compression of the spring 62, the normally closed valve of the valve unit 20 remains opened. When the gas pressure on the diaphragm 22 overcomes the compression of the spring 62, such valve is permitted to be restored to its normally closed condition. The flow rate of the oxygen or other gas is determined by the gas pressure within the chamber 16 and by the size of the outlet orifices (not shown).

The sleeve 66 is externally threaded for connection to an internally threaded axial opening (not indicated) in the cap 54, as shown, and is held in place by means of a nut 68. An annular boss 70, which is formed in the sleeve 66, prevents disassociation of the spring button 64 from the sleeve 66. An annular spacer 72 limits axial movement of the spring button 64 away from the diaphragm 22. A stem portion 74 of the spring button 64 passes freely through the spacer 72 and the boss 70 and is formed with a concave ball seat 76. A ball 78 is seated against the ball seat 76. A split bracket 80 is mounted to the sleeve 66 by means of a nut 82. A lever 84, which is pivotally mounted to the split bracket 80 by means of a suitably supported pivot pin 86, is formed with a cam surface 88. As shown, the cam surface 88 is assymetrically shaped such that pivotal movement of the lever 84 to a first pivotal position moves the ball 78 and the spring button 64 toward the diaphragm 22 to compress the spring 62, and such that pivotal movement of the lever 84 to a second pivotal position permits the ball 78 and the spring button 64 to move away from the diaphragm 22 to relax the spring 62. Wing portions, 90 and 92 respectively, of the lever 84 limit pivotal movement of the lever 84 at the first and second pivotal positions. As shown, a conventional cable clamp 94 is pivotally mounted to the lever 84, outwardly with respect to the pivot pin, and a conventional cable guide 96 is rigidly mounted to the cap 54 by means of a suitably bolted split bracket 98.

In accordance with the principles of this invention, the regulator 10 further comprises means 100 for relieving residual gas pressure upon movement of the movable member 64 away from the diaphragm 22. As shown, the means 100 generally comprises a relief valve 102 arranged to relieve gas pressure in the chamber 16 when opened and means 104 for closing the valve 102 upon movement of the spring button 64 toward the diaphragm 22 while permitting residual gas pressure in the chamber 16 to open the valve 102 upon movement of the spring button 64 away from the diaphragm 22.

The stem portion 34 of the valve opening member 24 is formed with a valve seat 106 opening into the chamber 16 through a passage 108 formed in the member 24. The stem portion 34 of the member 24 is suitably fabricated, as shown, both to provide an integral assembly of the member 24 and the bushing 50, as aforementioned, and to form the valve seat 106.

The valve seat 106 forms part of the valve 102. In addition, the valve 102 comprises a valve stem 110 movable toward and away from the valve seat 106 and guided by a socket 112 formed in the spring button 64. The valve stem 110 has an enlarged head portion 114 designed to hold a resiliently deformable insert 116 adapted to engage the valve seat 106 when the valve stem 110 is moved toward the valve seat 106.

The means 104 for closing the valve 102 comprises a helical spring 118 disposed between the enlarged head portion 114 of the valve stem 110 and the spring button 64. Preferably, the spring 118 leads the spring 62 slightly, as by 1/32 in., to insure that the insert 116 engages the valve seat 106 before the valve opening element 24 opens the normally closed valve of the valve unit 20 when the spring button 64 is moved toward the diaphragm.

Upon relaxation of the spring 62 in the aforementioned manner, the spring 118 also is relaxed to permit residual gas pressure in the chamber 16 to act on the insert 116 of the valve stem 110 and urge the valve stem 110 away from the valve seat 106. As the valve stem 110 moves away from the valve seat 106, such residual gas pressure is relieved through the passage 108 into the space generally enclosed by the cap 54 and the generally tubular portion 58 of the body 12. As shown, such space is vented by means of a passage 120 in the body 12 opening into a threaded socket 124 to which suitable external connections (not shown) may be made.

Preferably, in order to insure that complete relief of residual gas pressure in the chamber 16 is attained at any orientation of the regulator 10, the regulator 10 further comprises a pintle 126 disposed generally within the passage 108 in the valve opening member 24, and movable inwardly and outwardly of the valve seat 106, and a helical spring 128 disposed between a shoulder 130 in the passage 108 and an enlarged head portion 132 of the pintle 126 to urge the pintle 126 against the insert 116 of the valve stem 110. Thus, the spring 128 biases the valve stem 110 away from the valve seat 106.

The spring constant of the spring 128 should be substantially less than the spring constant of the spring 118 such that the spring 128 offers minimal resistance to movement of the valve stem 110 toward the valve seat 106 as the spring 118 is being compressed. However, the spring 128 should be capable of lifting the valve stem 110, the insert 116, and the spring 118 even if the regulator 10 is vertically oriented such that the combined weight of such parts tends to urge the valve stem 110 toward the valve seat 106.

Thus, it will be appreciated that all of the recited objects, advantages and features of this invention have been demonstrated as obtainable in a highly practical apparatus and one that is simple and positive in operation. It will be further understood that although this invention has been described with respect to certain specific embodiments thereof, this invention is not limited thereto, since various modifications of said invention will suggest themselves from the aforesaid description and are intended to be encompassed within the scope of the appended claims wherein there is claimed.

I claim:

1. In a gas pressure regulator of the type comprising a body having a chamber, valve means including a normally closed valve for controlling gas flow to said chamber, a diaphragm forming a wall of said chamber, a valve opening member mounted to said diaphragm and arranged to open said valve upon flexure of said diaphragm toward said valve means and to permit said valve to be restored upon opposite flexure of said diaphragm, a member movable toward and away from said diaphragm, and resilient means disposed between said movable member and said diaphragm and adapted to cause flexure of said diaphragm toward said valve means upon movement of said movable member toward said diaphragm and to permit opposite flexure of said movable member away from said diaphragm, the combination comprising a valve seat opening into said chamber, a valve stem movable toward and away from said valve seat and adapted to close said valve seat when moved toward said valve seat and to open said valve seat when moved away from said valve seat, resilient means disposed between said valve stem and said movable member and adapted to move said valve stem toward said valve seat upon movement of said movable member toward said diaphragm and to permit residual gas pressure to move said valve stem away from said valve seat upon movement of said movable member away from said diaphragm, and means for biasing said valve stem away from said valve seat while permitting said valve stem to move toward said valve seat upon movement of said movable member toward said diaphragm, said biasing means including a pintle disposed within a passage in said valve opening element and movable inwardly and outwardly of said valve seat and resilient means disposed to bias said pintle outwardly of said valve seat and against said valve stem thus to bias said valve stem away from said valve seat.

2. The combination of claim 1 wherein the resilient means of said biasing means comprises a helical spring disposed between a shoulder in the passage in said valve opening element and an enlarged head portion of said pintle.

3. The combination of claim 1 wherein the spring constant of the resilient means of said biasing means is less than the spring constant of the resilient means disposed between said valve stem and said movable member.

4. The combination of claim 3 wherein the resilient means of said biasing means is capable of moving said valve stem away from said valve seat, upon relaxation of the resilient means disposed between said valve stem and said movable member, even if the regulator is oriented such that the weight of said valve stem tends to urge said valve stem toward said valve seat.

* * * * *